(12) United States Patent
Baldwin

(10) Patent No.: US 7,686,730 B2
(45) Date of Patent: Mar. 30, 2010

(54) MULTIPLE SPEED AUTOMATIC TRANSMISSION

(75) Inventor: Reid A. Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 523 days.

(21) Appl. No.: 11/595,497

(22) Filed: Nov. 9, 2006

(65) Prior Publication Data

US 2008/0113844 A1    May 15, 2008

(51) Int. Cl.
*F16H 3/62* (2006.01)
(52) U.S. Cl. ............... 475/276; 475/280; 475/281; 475/284; 475/285
(58) Field of Classification Search ............ 475/271, 475/276, 281, 285, 278, 284, 280
See application file for complete search history.

(56) References Cited

U.S. PATENT DOCUMENTS

| | | | |
|---|---|---|---|
| 3,946,623 A | | 3/1976 | Murakami |
| 4,027,551 A | * | 6/1977 | Murakami et al. ......... 475/276 |
| 4,038,888 A | * | 8/1977 | Murakami et al. ......... 475/276 |
| 4,046,031 A | * | 9/1977 | Ott et al. ................. 475/280 |
| 4,089,239 A | * | 5/1978 | Murakami et al. ......... 475/276 |
| 4,683,776 A | | 8/1987 | Klemen |
| 4,744,267 A | * | 5/1988 | Lepelletier ............... 475/276 |
| 6,176,803 B1 | | 1/2001 | Meyer et al. |
| 6,752,793 B1 | | 6/2004 | Dascanio et al. |
| 6,960,149 B2 | | 11/2005 | Ziemer |
| 6,984,187 B2 | | 1/2006 | Biermann |
| 7,163,484 B2 | * | 1/2007 | Klemen ................... 475/276 |
| 2004/0102279 A1 | * | 5/2004 | Lee et al. ................. 475/276 |
| 2005/0064983 A1 | | 3/2005 | Tiesler |
| 2007/0072732 A1 | * | 3/2007 | Klemen ................... 475/280 |
| 2007/0213168 A1 | | 9/2007 | Gumpoltsberger |
| 2007/0259753 A1 | | 11/2007 | Diosi |

* cited by examiner

*Primary Examiner*—Sherry Estremsky
(74) *Attorney, Agent, or Firm*—David B. Kelley; MacMillan, Sobanski & Todd, LLC

(57) ABSTRACT

A multiple speed transmission includes an input and output; a first, second, third and fourth planetary gear sets, each gear set including a sun gear, a ring gear, a carrier, and pinions supported on the carrier and meshing with the sun gear and the ring gear; a first epicyclic gearing assembly including the first gear set, the second gear set, a first clutch, a first brake, a second brake, and first, second, third and fourth rotating members, said first clutch being operable to couple said first rotating member to the input, said first brake being operable to hold said fourth rotating member against rotation, and said second brake being operable to hold said second rotating member against rotation; and a second epicyclic gearing assembly including the third gear set, the fourth gear set, a second clutch, a third clutch, a third brake, and fifth, sixth, seventh and eighth rotating members, the third rotating member being secured to the eighth rotating member, said second control clutch being operable to couple said fifth rotating member to the input, said second control clutch being operable to couple said seventh rotating member to the input, said third brake being operable to hold the seventh rotating member against rotation, and said sixth rotating member being secured for rotation to the output.

8 Claims, 3 Drawing Sheets

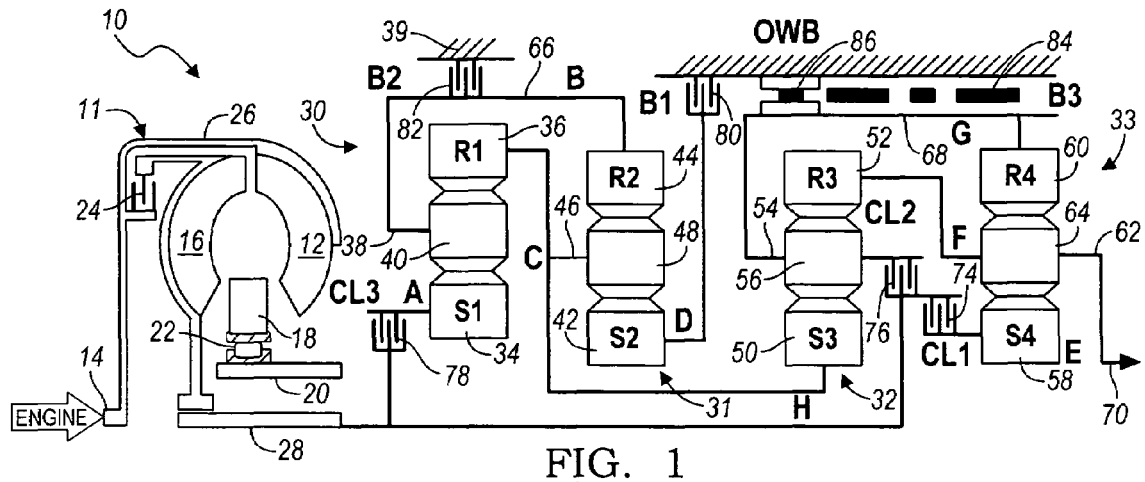
FIG. 1
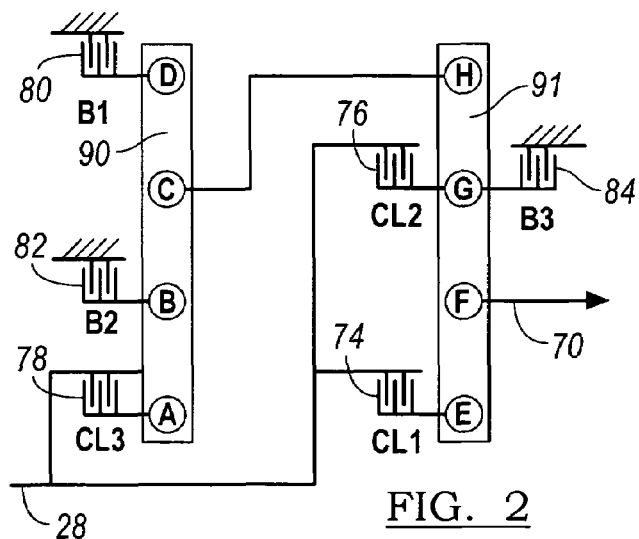
FIG. 2
| | 74 | 76 | 78 | 80 | 82 | 84 | 86 | |
|---|---|---|---|---|---|---|---|---|
| | CL1 | CL2 | CL3 | B1 | B2 | B3 | OWB | SR |
| REV | | | X | X | | X | | 4.822 |
| LOW | | | X | | X | | X | 5.250 |
| 1st | X | | (ALT) | (ALT) | (X) | | X | 3.500 |
| 2nd | X | | X | | X | | | 2.667 |
| 3rd | X | | | X | X | | | 1.806 |
| 4th | X | | X | X | | | | 1.337 |
| 5th | X | X | (X) | (ALT) | (ALT) | | | 1.000 |
| 6th | | X | X | X | | | | 0.788 |
| 7th | | X | | X | X | | | 0.677 |
| 8th | | X | X | | X | | | 0.600 |
FIG. 3
| BETA1 | 30 | 2.500 |
|---|---|---|
| BETA2 | 31 | 2.700 |
| BETA3 | 32 | 2.100 |
| BETA4 | 33 | 2.500 |
FIG. 4

|  | 74 | 76 | 78 | 80 | 82 | 84 | 86 |  |
|---|---|---|---|---|---|---|---|---|
|  | CL1 | CL2 | CL3 | B1 | B2 | B3 | OWB | SR |
| REV |  |  | X | X |  | X |  | 4.821 |
| LOW |  |  | X |  | X |  | X | 5.249 |
| 1st | X |  | (ALT) | (ALT) | (X) |  | X | 3.500 |
| 2nd | X | X |  |  | X |  |  | 2.667 |
| 3rd | X |  |  | X | X |  |  | 1.807 |
| 4th | X |  | X | X |  |  |  | 1.337 |
| 5th | X | X | (X) | (ALT) | (ALT) |  |  | 1.000 |
| 6th |  | X | X | X |  |  |  | 0.788 |
| 7th |  | X |  | X | X |  |  | 0.677 |
| 8th |  | X | X |  | X |  |  | 0.600 |

| BETA1 | 30 | 1.480 |
| BETA2 | 31 | 2.500 |
| BETA3 | 32 | 1.677 |
| BETA4 | 33 | 2.500 |

|  | 74 | 76 | 78 | 80 | 82 | 84 | 86 |  |
|---|---|---|---|---|---|---|---|---|
|  | CL1 | CL2 | CL3 | B1 | B2 | B3 | OWB | SR |
| REV |  |  | X | X |  | X |  | 4.821 |
| LOW |  |  | X |  | X |  | X | 5.249 |
| 1st | X |  | (ALT) | (ALT) | (X) |  | X | 3.500 |
| 2nd | X |  | X |  | X |  |  | 2.667 |
| 3rd | X |  |  | X | X |  |  | 1.807 |
| 4th | X |  | X | X |  |  |  | 1.337 |
| 5th | X | X | (X) | (ALT) | (ALT) |  |  | 1.000 |
| 6th |  | X | X | X |  |  |  | 0.788 |
| 7th |  | X |  | X | X |  |  | 0.677 |
| 8th |  | X | X |  | X |  |  | 0.600 |

| BETA1 | 30 | 2.700 |
|---|---|---|
| BETA2 | 31 | 2.500 |
| BETA3 | 32 | 1.667 |
| BETA4 | 33 | 2.500 |

US 7,686,730 B2

MULTIPLE SPEED AUTOMATIC TRANSMISSION

BACKGROUND OF THE INVENTION

1. Field of the Invention

This invention relates to the field of automatic transmissions for motor vehicles. More particularly, the invention pertains to a kinematic arrangement of gearing, clutches, brakes, and the interconnections among them in a power transmission.

2. Description of the Prior Art

Light trucks have been offered for sale with a variety of optional axle ratios. Customers that plan to tow heavy trailers usually order axles for such trucks that have higher torque ratios in order to get better performance when the vehicle is heavily loaded. Customers that do not plan to tow heavy trailers choose axles with less torque multiplication in order to get better highway fuel economy.

The steeper axle ratios improve vehicle launch capability when loaded, but reduce fuel economy even when the vehicle is unloaded. Providing multiple axle ratios adds complexity at the vehicle assembly plant. Operators of light truck having 4×4 drivelines seldom use the low-range capability of a two-speed transfer case.

Light trucks having 4×4 drivelines frequently offer a low-range capability within the transfer case. A very low ratio in the transmission would allow this feature to be offered in trucks with 4×2 drivelines and reduce the cost of transfer cases.

Most operators of such vehicle are accustomed to and prefer that the transmission provide a small first gear-second gear step. Eight-speed transmissions that have been proposed have gear mesh losses that exceeded those of highly efficient six-speed transmissions.

There is a need for a transmission that provides sufficient speed ratio span, such that all vehicles can have superior towing capability and also have superior highway fuel economy whenever the vehicle is not towing a heavy load. In order to accomplish this objective, the transmission should provide similar ratios to a state of the art six speed automatic transmission plus an additional low range gear.

SUMMARY OF THE INVENTION

Most transmissions that provide a large span have at least one excessively large step. The largest step produced with a transmission having the proposed beta ratios is only 1.50. This arrangement uses only simple planetary gear sets with beta ratios that are common. In addition to providing a special low forward ratio, this arrangement also provides an extra overdrive ratio with small step sizes among the overdrive ratios.

This enables significantly lower engine speeds for typical highway driving, and will produce substantially improved fuel economy.

The transmission provides similar gear ratios to those of a state of the art six speed automatic transmission and an additional low range gear.

A multiple speed transmission includes an input and output; a first, second, third and fourth planetary gear sets, each gear set including a sun gear, a ring gear, a carrier, and pinions supported on the carrier and meshing with the sun gear and the ring gear; a first epicyclic gearing assembly including the first gear set, the second gear set, a first clutch, a first brake, a second brake, and first, second, third and fourth rotating members, said first clutch being operable to couple said first rotating member to the input, said first brake being operable to hold said fourth rotating member against rotation, and said second brake being operable to hold said second rotating member against rotation; and a second epicyclic gearing assembly including the third gear set, the fourth gear set, a second clutch, a third clutch, a third brake, and fifth, sixth, seventh and eighth rotating members, the third rotating member being secured to the eighth rotating member, said second control clutch being operable to couple said fifth rotating member to the input, said second control clutch being operable to couple said seventh rotating member to the input, said third brake being operable to hold the seventh rotating member against rotation, and said sixth rotating member being secured for rotation to the output.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which:

FIG. 1 is a schematic diagram illustrating the kinematic arrangement of a transmission that incorporates planetary gear sets;

FIG. 2 is a schematic lever diagram representing interconnections among components of the transmission of FIG. 1;

FIG. 3 is a chart showing for each forward and reverse speed ratio the operating state of the clutches and brakes that control the transmission of FIG. 1;

FIG. 4 is a chart showing preferred beta ratios for each gear set of the transmission of FIG. 1;

DESCRIPTION OF THE PREFERRED EMBODIMENT

Figures 5, 6, 7:
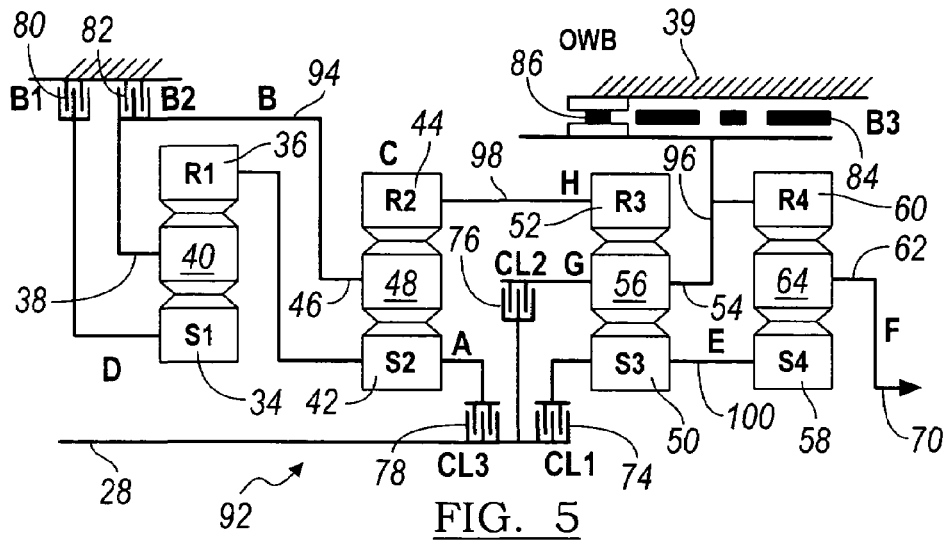
FIG. 5 is a schematic diagram illustrating a second embodiment of a transmission that incorporates planetary gear sets.
FIG. 6 is a chart showing for each forward and reverse speed ratio the operating state of the clutches and brakes that control the transmission of FIG. 5.
FIG. 7 is a chart showing preferred beta ratios for each gear set of the transmission of FIG. 5.

Referring now to the drawings, there is illustrated in FIG. 1 the kinematic arrangement of an automatic transmission 10. A torque converter includes a bladed impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter includes a lockup clutch 24 located within the torque converter impeller housing 26. When clutch 24 is engaged, the turbine and impeller are mechanically connected to a transmission input shaft 28; when clutch 24 is disengaged, the turbine and impeller are hydrokinetically connected and mechanically disconnected. Fluid contained in the torque converter is supplied to the torque converter from the output of an oil pump assembly (not shown) and is returned to an oil sump, to which an inlet of the pump is connected hydraulically.

A planetary gear system includes first, second, third, and fourth gear units 30-33. The first gear unit 30 is a planetary gear set, which includes a sun gear 34, ring gear 36, carrier 38, and planet pinions 40 supported on carrier 38 and meshing with sun gear 34 and ring gear 36. The second gear unit 31 is a planetary gear set, which includes a sun gear 42, ring gear 44, carrier 46, and planet pinions 48 supported on carrier 46 and meshing with sun gear 42 and ring gear 44. The third gear unit 32 is a planetary gear set, which includes a sun gear 50, ring gear 52, carrier 54, and planet pinions 56 supported on carrier 54 and meshing with sun gear 50 and ring gear 52. The fourth gear unit 33 is a planetary gear set, which includes a sun gear 58, ring gear 60, carrier 62, and planet pinions 64 supported on carrier 62 and meshing with sun gear 58 and ring gear 60.

The carrier 38 of the first gear unit 30 is secured by drum 66 to ring gear 44 for rotation as a unit. The ring gear 36 of the first gear unit 30 and carrier 46 are mutually driveably connected and are secured also to sun gear 50 for rotation as a unit. The carrier 54 of the third gear unit 32 is secured by drum 68 to ring gear 60 for rotation as a unit. The ring gear 52 of the third gear unit 32 and carrier 62 are mutually driveably connected and are secured also to the output 70.

Input 28 is alternately driveably connected to and disconnected from sun gear 58 by clutch 74 (CL1). Input 28 is alternately driveably connected to and disconnected from carrier 54 by clutch 76 (CL2). Input 28 is alternately driveably connected to and disconnected from sun gear 34 by clutch 78 (CL3). Sun gear 42 is alternately held against rotation, preferably on the transmission case 39, upon engagement of a brake 80 (B1) and is released for free rotation upon disengagement of brake 80. Carrier 38 and ring gear 44 are alternately held against rotation, preferably on the transmission case 39, upon engagement of a brake 82 (B2) and are released for free rotation upon disengagement of brake 82. Carrier 54 and ring gear 60 are alternately held against rotation, preferably on the transmission case 39, upon engagement of a band brake 84 (B3) and are released for free rotation upon disengagement of brake 84. A one-way brake 86 (OWB) alternately holds carrier 54 and ring gear 60 against rotation on the transmission case 39 in one rotary direction and releases them to rotate freely in the opposite direction.

Clutches 74, 76, 78 and brakes 80, 82 are preferably hydraulically-actuated control devices having sets of interleaved friction discs and spacer plates, the discs being secured to one element of the clutch or brake, the spacer plates secured to another element of the clutch or brake. When hydraulic pressure increases in the cylinder of a servo that actuates a respective friction element, the discs and plates of the respective friction element are forced by displacement of the servo piston into mutual frictional contact, thereby producing a drive connection between the components of the gear units to which the elements of the clutch or brake are secured. When the pressure is vented from the servo cylinder, the clutch or brake is disengaged and the components are free to rotate independently. Preferably band brake 84 is actuated to engage drum 68 in response to the magnitude of hydraulic pressure in the cylinder of a servo. OWB 86 may be actuated by a sprag, roller, rocker or a similar device in response to the rotary direction and relative speed of drum 68 relative to housing 39.

Although the one-way brake 86 is operative to produce a non-synchronous 1-2 upshift and to reduce open brake viscous drag, brake 86 can be deleted and its function replaced by brake 84.

Although transmission 10, as illustrated, includes a torque converter for use in launching a vehicle from a stopped condition, the torque converter can be deleted and clutch 78 (CL3) can be used instead to transmit power between the power source, such as an engine or electric motor, and input 28 in the lowest forward gears and reverse gear during vehicle launch conditions.

FIG. 2 is a lever diagram having two levers 90, 91 and representing transmission 10. On the first lever 90, which corresponds to gear sets 30 and 31, node A, a first rotating member A, represents sun gear 34; node B, a second rotating member B, represents drum 66, which connects carrier 38 and ring gear 44; node C, a third rotating member C, represents ring gear 36 and carrier 46; and node D, a fourth rotating member D, represents sun gear 42. A torsional reaction is produced by brake 80 at rotating member D. A torsional reaction is produced by brake 82 at rotating member B.

On the second lever 91, which corresponds to gear sets 32 and 33, node E, a fifth rotating member E, represents sun ring gear 58; node F, a sixth rotating member F, represents ring gear 52, carrier 62 and output 70; node G, a seventh rotating member G, represents drum 68, which connects ring gear 60 and carrier 54; and node H, an eighth rotating member H, represents sun gear 50. A torsional reaction is produced by brake 84 and OWC 86 at node G.

Input 28 is connected by clutch 78 to rotating member A, by clutch 74 to rotating member E, and by clutch 76 to rotating member G. Rotating members C and H are continually mutually interconnected.

Operation of the transmission 10 is described next with reference to the engaged and disengaged state of the friction elements, which states in combination produce each of the gear ratios. Preferably, the states of the clutches and brakes are changed automatically in accordance with execution of a control algorithm by an electronic transmission controller. FIG. 3 is a chart indicating the state of engagement and disengagement of the clutches and brakes corresponding to each the gears. In the chart, symbol "X" indicates an engaged clutch or brake that is engaged to produce the respective gear, "(X)" indicates a clutch or brake that may be engaged, but does not affect operation in the respective gear, and "(alt)" indicates a clutch or brake that may be engaged alternately instead of the clutch or brake marked "(X)" for the respective gear. A blank indicates that the corresponding clutch and brake is disengaged or released. In low gear, the "X" for OWB 86 indicates that the brake is producing a drive connection to the housing 39 and is not overrunning. FIG. 3 shows for each forward and reverse gear the operating state of the clutches and brakes that control the transmission of FIG. 1 and the speed ratio for the respective gear. The speed ratio of a transmission is the ratio of the speed of its input to the speed of its output.

The transmission 10 operates in a low forward gear when clutch 78 and brakes 82 and 86 are engaged, and the other friction elements are disengaged. With carrier 38 of the first gear unit 30 held against rotation and its sun gear 34 directly connected to input 28, ring gear 36 and sun gear 50 are underdriven in a reverse direction relative to the speed and direction of input 28. Brake 86 holds carrier 54 against rotation and produces a torque reaction on the transmission case 39. With carrier 54 held against rotation, rotating member F is underdriven in a reverse direction relative to the speed and direction of ring gear 50. With the transmission operating in low gear, the speed ratio of the transmission is 5.250, provided β, the ratio of the number of gear teeth of the ring gear to the number of gear teeth of the sun gear for the respective gear sets 30-33 is as set forth in FIG. 4.

The transmission 10 operates in the first forward gear when clutch 74 and brake 86 are engaged, and clutch 76 is disengaged. With ring gear 60 of gear unit 33 held against rotation and its sun gear 58 directly connected to input 28, carrier 62 and output 70 are underdriven relative to the speed of input 28. With the transmission operating in first gear, the ratio of the speed of input 28 and the speed of output 60 is 3.500, provided β, the ratio of the number of gear teeth of the ring gear to the number of gear teeth of the sun gear for the respective gear sets 30-33 is as set forth in FIG. 4. In order for all of the element speeds to be constrained relative to the input speed, exactly one of clutch 78, brake 80, or brake 82 must be engaged.

An upshift to the second speed ratio results by maintaining clutch 74 engaged and engaging brake 82 and clutch 78, causing one-way brake 86 to overrun. Rotating member C, ring gear 56 and sun gear 50, is underdriven in a reverse direction relative to the speed and direction of input 28. Sun gear 58 is connected by clutch 74 to the input. Rotating member F is underdriven in a forward direction relative to the speed and direction of input 28. With the transmission operating in second gear, the ratio of the speed of input 28 and the speed of output 70 is 2.667, provided β, the ratio of the number of gear teeth of the ring gear to the number of gear teeth of the sun gear for the respective gear sets 30-33 is as set forth in FIG. 4.

An upshift to third gear from second gear results upon disengaging clutch 78, engaging brake 80, and maintaining brake 82 and clutch 74 engaged. With rotating members B and D held against rotation, and sun gear 58 rotating at the speed of input 28, rotating member F is underdriven relative to the speed of the input 28 due to the speed reduction produced in the third and fourth gear sets 32, 33. With the transmission operating in third gear, the ratio of the speed of input 28 and the speed of output 70 is 1.806, provided β, the ratio of the number of gear teeth of the ring gear to the number of gear teeth of the sun gear for the respective gear sets 30-33 is as set forth in FIG. 4.

An upshift to fourth gear from third gear results upon engaging clutch 78, disengaging brake 82, and maintaining clutch 74 and brake 80 engaged. With sun gears 34 and 58 driven at the speed of input 28, and sun gear 42 held against rotation, rotating member F is underdriven relative to the speed of the input 28. While the transmission operates in fourth gear, the ratio of the speed of input 28 and the speed of output 70 is 1.377, provided β, the ratio of the number of gear teeth of the ring gear to the number of gear teeth of the sun gear for the respective gear sets 30-33 is as set forth in FIG. 4.

An upshift to fifth gear from fourth gear results by maintaining clutch 74 engaged, engaging clutch 76, and disengaging either brake 80 or 78. With rotating members G and E rotating at the speed of input 28, i.e., with carrier 54, ring gear 60 and sun gear 58 rotating with input 28, gear sets 32 and 33 are locked-up and the speed of rotating member 70 is equal to that of input 28.

An upshift to sixth gear from fifth gear results upon engaging clutch 78 and brake 80, disengaging clutch 74, and maintaining clutch 76 engaged. With the friction elements so disposed, rotating member C is underdriven in the forward direction relative to the speed and direction of input 28, rotating member G is driven at the speed of input 28, and rotating member F is overdriven relative to the speed of input 28. With the transmission operating in sixth gear, the ratio of the speed of input 28 and the speed of output 70 is 0.788, provided β, the ratio of the number of gear teeth of the ring gear to the number of gear teeth of the sun gear for the respective gear sets 30-33 is as set forth in FIG. 4.

An upshift to seventh gear from sixth gear results upon engaging brake 82, releasing clutch 78, and maintaining clutch 76 and brake 80 engaged. With the control elements so disposed, the first and second gear sets 30 and 31 are lock-up and non-rotating due to the engagement of brakes 80 and 82. With sun gear 32 held against rotation and carrier 54 driven at the speed of input 28, a speed amplification is produced in gear set 32, thereby overdriving rotating member F. With the transmission operating in seventh gear, the ratio of the speed of input 28 and the speed of output 7 is 0.677, provided β, the ratio of the number of gear teeth of the ring gear to the number of gear teeth of the sun gear for the respective gear sets 30-33 is as set forth in FIG. 4.

An upshift to eighth gear from seventh gear results upon engaging clutch 78, disengaging brake 80, and maintaining clutch 76 and brake 82 engaged. With the friction control elements so disposed, carrier 38 is held against rotation, sun gear 34 is driven at the speed of input 28, and rotating member C is underdriven in a reverse direction relative to the speed and direction of input 28. With carrier 54 and ring gear 60 rotating at the speed of input 28 and sun gear 50 underdriven in a reverse direction, rotating member F is overdriven relative to input 28. With the transmission operating in eighth gear, the ratio of the speed of input 28 and the speed of output 70 is 0.60, provided β, the ratio of the number of gear teeth of the ring gear to the number of gear teeth of the sun gear for the respective gear sets 30-33 is as set forth in FIG. 4.

Reverse gear is produced upon engaging clutch 78 and brakes 80 and 84 concurrently, and releasing the other friction elements. With the friction control elements so disposed, carrier 38 is held against rotation, sun gear 34 is driven at the speed of input 28, and rotating member C is underdriven relative to the speed of input 28. With carrier 54 held against rotation and sun gear underdriven in a reverse direction relative to the speed and direction of input 28, an additional speed reduction and direction change are produced in gear set 32, whereby rotating member G is underdriven in a reverse direction relative to the speed and direction of input 28. With the transmission operating in reverse gear, the ratio of the speed of input 28 and the speed of output 70 is −4.822, provided β, the ratio of the number of gear teeth of the ring gear to the number of gear teeth of the sun gear for the respective gear sets 30-33 is as set forth in FIG. 4.

FIG. 5 illustrates a transmission 92 having an alternate kinematic arrangement from that of FIG. 1, but whose kinematic arrangement is represented in the lever diagram of FIG. 2. The carrier 38 of the first gear unit 30 is secured by drum 94 to carrier 46 for rotation as a unit. The ring gear 36 of the first gear unit 30 and sun gear 42 are mutually driveably connected for rotation as a unit. The carrier 54 of the third gear unit 32 is secured by connector 96 to ring gear 60 for rotation as a unit. The ring gear 52 of the third gear unit 32 and ring gear 44 of the second gear unit 31 are mutually driveably connected by drum 98 for rotation as a unit. Sun gears 50 and 58 are mutually driveably connected by drum 100 for rotation as a unit.

Input 28 is alternately driveably connected to and disconnected from sun gear 50 by clutch 74 (CL1). Input 28 is alternately driveably connected to and disconnected from carrier 54 by clutch 76 (CL2). Input 28 is alternately driveably connected to and disconnected from sun gear 42 by clutch 78 (CL3). Sun gear 34 is alternately held against rotation, preferably on the transmission case 39, upon engagement of brake 80 (B1) and is released for free rotation upon disengagement of brake 80. Carrier 38 and carrier 46 are alternately held against rotation, preferably on the transmission case 39, upon engagement of brake 82 (B2) and are released for free rotation upon disengagement of brake 82. Carrier 54 and ring gear 60 are alternately held against rotation, preferably on the transmission case 39, upon engagement of band brake 84 (B3) and are released for free rotation upon disengagement of brake 84. One-war brake 86 (OWB) alternately holds carrier 54 and ring gear 60 against rotation on the transmission case 39 in one rotary direction and releases them to rotate freely in the opposite direction.

The lever diagram of FIG. 2 applies also to transmission 92 of FIG. 5. On the first lever 90, which corresponds to gear sets 30 and 31, node A, a first rotating member A, represents sun gear 42 and ring gear 36; node B, a second rotating member B, represents drum 94, which connects carrier 38 and carrier 46; node C, a third rotating member C, represents ring gear 44; and node D, a fourth rotating member D, represents sun gear 34. A torsional reaction is produced by brake 80 at rotating member D. A torsional reaction is produced by brake 82 at rotating member B.

On the second lever 91, which corresponds to gear sets 32 and 33, node E, a fifth rotating member E, represents sun gears 50 and 58; node F, a sixth rotating member F, represents carrier 62 and output 70; node G, a seventh rotating member G, represents connector 96, which connects ring gear 60 and carrier 54; and node H, a eighth rotating member H, represents ring gear 52. A torsional reaction is produced by brake 84 and OWB 86 at rotating member G.

Input 28 is connected by clutch 78 to rotating member A, by clutch 74 to rotating member E, and by clutch 76 to rotating member G. Rotating members C and H are continually mutually interconnected.

Transmission 92 operates in eight forward gears, low gear and reverse gear when the clutches and brakes have the states of engagement and disengagement shown in FIG. 6, which are identical to those of FIG. 3. The speed ratios produced in each gear, which are identical to those of FIG. 3, are shown also in FIG. 6, provided β, the ratio of the number of gear teeth of the ring gear to the number of gear teeth of the sun gear for the respective gear sets 30-33 is as set forth in FIG. 7.

Figures 8, 9, 10:
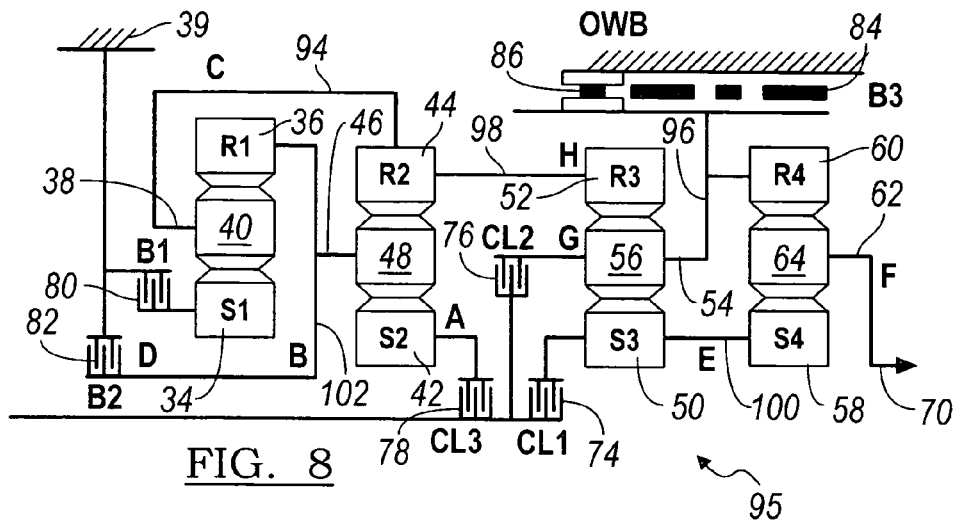
FIG. 8 is a schematic diagram illustrating the kinematic arrangement of a transmission that incorporates planetary gear sets.
FIG. 9 is a chart showing for each forward and reverse speed ratio the operating state of the clutches and brakes that control the transmission of FIG. 8.
FIG. 10 is a chart showing preferred beta ratios for each gear set of the transmission of FIG. 8.

FIG. 8 illustrates a transmission 95 having an alternate kinematic arrangement from that of FIGS. 1 and 5, and whose kinematic arrangement is represented in the lever diagram of FIG. 2. The carrier 38 of the first gear unit 30 is secured by drum 94 to ring gear 44 for rotation as a unit. The ring gear 36 of the first gear unit 30 and carrier 46 are mutually driveably connected for rotation as a unit. The carrier 54 of the third gear unit 32 is secured by connector 96 to ring gear 60 for rotation as a unit. The ring gear 52 of the third gear unit 32 and ring gear 44 of the second gear unit 31 are mutually driveably connected by drum 98 for rotation as a unit. Sun gears 50 and 58 are mutually driveably connected by drum 100 for rotation as a unit Input 28 is alternately driveably connected to and disconnected from sun gear 50 by clutch 74 (CL1). Input 28 is alternately driveably connected to and disconnected from carrier 54 by clutch 76 (CL2). Input 28 is alternately driveably connected to and disconnected from sun gear 42 by clutch 78 (CL3). Sun gear 34 is alternately held against rotation, preferably on the transmission case 39, upon engagement of brake 80 (B1) and is released for free rotation upon disengagement of brake 80. Carrier 46 and ring gear 36 are alternately held against rotation, preferably on the transmission case 39, upon engagement of brake 82 (B2) and are released for free rotation upon disengagement of brake 82. Carrier 54 and ring gear 60 are alternately held against rotation, preferably on the transmission case 39, upon engagement of band brake 84 (B3) and are released for free rotation upon disengagement of brake 84. One-way brake 86 (OWB) alternately holds carrier 54 and ring gear 60 against rotation on the transmission case 39 in one rotary direction and releases them to rotate freely in the opposite direction.

The lever diagram of FIG. 2 applies to transmission 95 of FIG. 8. On the first lever 90, which corresponds to gear sets 30 and 31, node A, a first rotating member A, represents sun gear 42; node B, a second rotating member B, represents connector 102, which connects carrier 46 and ring gear 36; node C, a third rotating member C, represents drum 94, which connects carrier 38 and ring gear 44; and node D, a fourth rotating member D, represents sun gear 34. A torsional reaction is produced by brake 80 at rotating member D. A torsional reaction is produced by brake 82 at rotating member B.

On the second lever 91, which corresponds to gear sets 32 and 33, node E, a fifth rotating member E, represents sun gears 50 and 58; node F, a sixth rotating member F, represents carrier 62 and output 70; node G, a seventh rotating member G, represents connector 96, which connects ring gear 60 and carrier 54; and node H, a eighth rotating member H, represents ring gear 52. A torsional reaction is produced by brake 84 and OWB 86 at rotating member G.

Input 28 is connected by clutch 78 to rotating member A, by clutch 74 to rotating member E, and by clutch 76 to rotating member G. Rotating members C and H are continually mutually interconnected.

Transmission 95 operates in eight forward gears, low gear and reverse gear when the clutches and brakes have the states of engagement and disengagement shown in FIG. 9, which are identical to those of FIGS. 3 and 6. The speed ratios produced in each gear, which are identical to those of FIGS. 3 and 6, are shown also in FIG. 9, provided β, the ratio of the number of gear teeth of the ring gear to the number of gear teeth of the sun gear for the respective gear sets 30-33 is as set forth in FIG. 10.

A transmission embodiment according to this invention may contain two epicyclic gearing assemblies, each with four members that rotate around a common axis. In each epicyclic gearing assembly, two of the rotating elements have the most extreme speeds at all times, while the speeds of the other two elements are a weighted average of those two speeds. The weighting factors are determined by the configuration of the epicyclic gearing assembly and the ratios of the numbers of gear teeth. These epicyclic gearing assemblies are represented by levers in FIG. 2. The nodes on the endpoints of the levers (A, D, E, and H) represent the two elements that have the most extreme speeds, while the interior nodes (B, C, F, and G) represent the nodes whose speeds are a weighted average of the former group.

There are many possible configurations of epicyclic gearing assemblies that will produce any particular desired weighting factors. Two such configurations have been illustrated here for each of the two epicyclic gearing assemblies. It should be noted that other known configurations of epicyclic gearing assemblies, which achieve the same or similar weighting factors can be substituted for those illustrated without departing from the spirit of this invention. Specifically, in some configurations, the planetary gear sets contain two sets of pinion gears instead of one, with an inner set meshing with the sun gear, the outer set meshing with the ring gear, and the two sets meshing with each other. In other configurations, such as a Ravigneaux arrangement, some of the pinion gears are shared between multiple gear sets.

In accordance with the provisions of the patent statutes, the preferred embodiment has been described. However, it should be noted that the alternate embodiments can be practiced otherwise than as specifically illustrated and described.

What is claimed is:

1. A transmission for automotive vehicles, comprising:
   an input and an output;
   a first, second, third and fourth planetary gear sets, each gear set including a sun gear, a ring gear, a carrier, and pinions supported on the carrier and meshing with the sun gear and the ring gear;
   the carrier of the first gear set being secured to the carrier of the second gear set;
   the ring gear of the first gear set being secured to the sun gear of the second gear set;
   the ring gear of the second gear set being secured to the ring gear of the third gear set;
   the sun of the third gear set and the sun gear of the fourth gear set being secured mutually;
   the carrier of the third gear set and the ring gear of the fourth gear set being secured mutually;
   the carrier of the fourth gear set and the output being secured mutually;
   a first clutch for alternately driveably connecting and disconnecting the input to the sun gear of the third gear set and sun gear of the fourth gear set;
   a second clutch for alternately driveably connecting and disconnecting the input to the carrier of the third gear set and ring gear of the fourth gear set;
   a third clutch for alternately driveably connecting and disconnecting the input to the sun gear of the second gear set and ring gear of the first gear set;
   a first brake for holding the sun gear of the first gear set against rotation; and
   a second brake for holding the carrier of the first gear set and the carrier of the second gear set against rotation.

2. The transmission of claim 1, further comprising:
   a third brake for holding the carrier of the third gear set and the ring gear of the fourth gear set against rotation.

3. The transmission of claim 2, wherein the third brake is a one-way brake.

4. The transmission of claim 2, wherein the third brake is hydraulically actuated friction brake.

5. A multiple speed transmission for automotive vehicles, comprising:
   an input and an output;
   a first, second, third and fourth planetary gear sets, each gear set including a sun gear, a ring gear, a carrier, and pinions supported on the carrier and meshing with the sun gear and the ring gear;
   the carrier of the first gear set, ring gear of the second gear set, and ring gear of the third gear set being secured mutually;
   the ring gear of the first gear set being secured to the carrier gear of the second gear set;
   the sun of the third gear set and sun gear of the fourth gear set being secured mutually;
   the carrier of the third gear set and ring gear of the fourth gear set being secured mutually;
   the carrier of the fourth gear set and the output being secured mutually;
   a first clutch for alternately driveably connecting and disconnecting the input to the sun gear of the third gear set and sun gear of the fourth gear set;
   a second clutch for alternately driveably connecting and disconnecting the input to the carrier of the third gear set and ring gear of the fourth gear set;
   third clutch for alternately driveably connecting and disconnecting the input and the sun gear of the second gear set;
   a first brake for holding the sun gear of the first gear set against rotation; and
   a second brake for holding the ring gear of the first gear set and the carrier of the second gear set against rotation.

6. The transmission of claim 5, further comprising:
   a third brake for holding the carrier of the third gear set and the ring gear of the fourth gear set against rotation.

7. The transmission of claim 6, wherein the third brake is a one-way brake.

8. The transmission of claim 6, wherein the third brake is a hydraulically actuated friction brake.

* * * * *